US007953044B2

(12) United States Patent
Xia et al.

(10) Patent No.: US 7,953,044 B2
(45) Date of Patent: May 31, 2011

(54) METHOD, COMPONENT AND SYSTEM FOR NETWORK-BASED HANDOVER

(75) Inventors: Yangsong Xia, Jiangsu Province (CN); Behcet Sarikaya, Wylie, TX (US)

(73) Assignee: FutureWei Technologies, Inc., Plano, TX (US)

(*) Notice: Subject to any disclaimer, the term of this patent is extended or adjusted under 35 U.S.C. 154(b) by 762 days.

(21) Appl. No.: 12/023,192

(22) Filed: Jan. 31, 2008

(65) Prior Publication Data

US 2008/0198807 A1 Aug. 21, 2008

Related U.S. Application Data

(60) Provisional application No. 60/890,333, filed on Feb. 16, 2007, provisional application No. 60/946,719, filed on Jun. 27, 2007.

(51) Int. Cl.
*H04L 12/26* (2006.01)
(52) U.S. Cl. .................................................... 370/331
(58) Field of Classification Search .................. None
See application file for complete search history.

(56) References Cited

U.S. PATENT DOCUMENTS

| 6,751,672 | B1 | 6/2004 | Khalil et al. | |
|---|---|---|---|---|
| 7,161,929 | B1 * | 1/2007 | O'Neill et al. | ............... 370/349 |
| 7,356,020 | B2 | 4/2008 | O'Neill | |
| 7,382,748 | B1 | 6/2008 | Bharatia et al. | |
| 2003/0137974 | A1 | 7/2003 | Kwan et al. | |
| 2004/0136348 | A1 | 7/2004 | Han | |
| 2004/0218566 | A1 | 11/2004 | Han | |
| 2006/0274693 | A1 * | 12/2006 | Nikander et al. | ............... 370/331 |
| 2007/0091850 | A1 | 4/2007 | Lee et al. | |
| 2007/0133463 | A1 | 6/2007 | Hori et al. | |
| 2007/0248083 | A1 | 10/2007 | Kasapidis | |
| 2007/0268919 | A1 | 11/2007 | Sarikaya et al. | |

FOREIGN PATENT DOCUMENTS

| CN | 1484407 A | 3/2004 |
|---|---|---|
| CN | 1543256 A | 11/2004 |
| CN | 1705285 A | 12/2005 |
| CN | 1875579 A | 12/2006 |
| CN | 1879365 A | 12/2006 |
| EP | 1 679 834 A1 | 7/2006 |
| EP | 1 684 470 A1 | 7/2006 |
| KR | 10-0694302 B1 | 3/2007 |

(Continued)

OTHER PUBLICATIONS

Bradner, Key words for use in RFCs to Indicate Requirement Levels, Best Current Practice, BCP 14, RFC 2119, Mar. 1997. (http://www.ietf.org/rfc/rfc2119.txt. Jun. 20, 2008).

(Continued)

*Primary Examiner* — Raj K Jain
(74) *Attorney, Agent, or Firm* — Slater & Matsil, L.L.P.

(57) ABSTRACT

A method for handover in a network is provided. The method includes receiving a first message from a first access network device associated with a mobile node (MN) associated with a first access router. A second message is sent to a second access router associated with a second access network device to initiate handover. A third message in response to the second message is received to establish a tunnel between the first access router and the second access router for handover. Packets designated to the MN are forwarded from the first access router to the second access router through the tunnel.

25 Claims, 6 Drawing Sheets

FOREIGN PATENT DOCUMENTS

| KR | 10-2007-0061296 A | 6/2007 |
|---|---|---|
| WO | WO 2005/053187 A1 | 6/2005 |
| WO | WO 2006/003497 A1 | 1/2006 |

OTHER PUBLICATIONS

Gundavelli et al., "Proxy Mobile IPv6", Internet Draft, Jan. 5, 2007, draft-sgundave-mip6-proxymip6-01 (work in progress), (http://tools.ietf.org/html/draft-sgundave-mip6-proxymip6-01, Jul. 7, 2008).

Institute of Electrical and Electronics Engineer, "Draft IEEE Standard for Local and Metropolitan Area Networks: Media Independent Handover Services", IEEE P802.21/D00.05, Jan. 2006.

Jang et al., "Mobile IPv6 Fast Handovers over IEEE 802.16e Networks" Internet-draft, dated Jan. 2, 2007, draft-ietf-mipshop-fh80216e-01 (work in progress), Jan. 2007, (http://www3.tools.ietf.org/html/draft-ietf-mipshop-fh80216e-01, Jun. 20, 2008).

Koodli, "Fast Handovers for Mobile IPv6", RFC 4068, Jul. 2005, (http://www.ietf.org/rfc/rfc4068.txt., Jun. 20, 2008.).

Madanapalli, "Analysis of IPv6 Link Models for 802.16 based Networks" Internet-draft, draft-ietf-16ng-link-model-analysis-02 (work in progress) dated Jan. 11, 2007, (http://tools.ietf.org/html/draft-ietf-16ng-ipv6-link-model-anaysis-02, Jun. 20, 2008).

Narten et al, Neighbor Discovery for IP Version 6 (IPv6), RFC 2461. Dec. 1998. (http://www.ietf.org/rfc/rfc2461.txt, Jul. 7, 2008).

Patil et al., "IPv6 Over the IP Specific part of the Packet Convergence sublayer in 802.16 Networks", Internet-Draft dated Jan. 23, 2007, draft-ietf-16ng-ipv6-over-ipv6cs-07 (work in progress), http://tools.ietf.org/html/draft-ietf-16ng-ipv6-over-ipv6cs-07, Jun. 20, 2008.

Sun et al., "Mobile IP Technique", Aug. 2003, version 1, pp. 125-129, ISBN 7-5053-8754-5.

International Search Report and Written Opinion of PCT Application No. PCT/CN2008/070310, mailed on May 8, 2008, 11 pages total.

Haddad, W., et al., "Authenticating FMIPv6 Handovers; draft-haddad-mipshop-fmipv6-auth-02," MIPSHOP Working Group, Internet-Draft, Sep. 21, 2006, 15 pages, The Internet Society.

Haddad, W., et al., "Secure Neighbor Discovery (SEND) Optimization and Adaptation for Mobility: The OptiSEND Protocol; draft-haddad-mipshop-optisend-02," Network Working Group, Internet-Draft, Oct. 23, 2006, 13 pages, The Internet Society.

Yokota, H., et al., "Mobile IPv6 Fast Handovers for 3G CDMA Networks; draft-ietf-mipshop-3gfh-01.txt," Internet Engineering Task Force, Network Working Group, Internet-Draft, Oct. 23, 2006, 40 pages, The Internet Society.

Jang, H., et al., "DHCP Options for Home Information Discovery in MIPv6; draft-ietf-mip6-hiopt-17.txt," Internet Engineering Task Force, MIP6 Working Group, Internet-Draft, Intended status: Standards Track, May 22, 2008, 22 pages, The IETF Trust.

International Preliminary Report on Patentability, International Application No. PCT/CN2008/070319, Applicant: Huawei Technologies Co., Ltd., Date of issuance: Aug. 19, 2009, 5 pages.

Chinese Office Action, Chinese Application No. 200880000951.1, Date of mailing: Mar. 30, 2010, 13 pages.

Supplementary European Search Report, European Application No. 08706692.4-2413, Applicant: Huawei Technologies Co., Ltd., Dated: Oct. 4, 2010, 7 pages.

\* cited by examiner

| Type 502 | Length 504 | Reserved 508 {514 | Vendor ID 512 | String 516 |

METHOD, COMPONENT AND SYSTEM FOR NETWORK-BASED HANDOVER

CROSS-REFERENCES TO RELATED APPLICATIONS

This application claims benefit of priorities to U.S. Provisional Application 60/890,333, filed Feb. 16, 2007, and U.S. Provisional Application No. 60/946,719, filed Jun. 27, 2007, commonly assigned, and which is incorporated by reference as if fully set forth.

BACKGROUND OF THE INVENTION

Mobile internet protocol (IP) defines a mobility scheme for a mobile user to continuously access data when the attachment is changed to the other network, which is a process referred to as handover. During handover, there is a period during which the mobile node (MN) is unable to send or receive packets due to the delays resulting from both link switching and IP protocol operation. The latency during handover results in packet loss and result in the performance degradation of network transmission.

The handover latency' resulting from the Mobile IP procedure, namely movement detection, new Care of Address configuration and Binding Update, is often unacceptable to real-time traffic such as Voice over IP. Reducing the handover latency could be beneficial to non real-time, throughput-sensitive applications as well. Fast handover specifies a protocol to improve handover latency due to the Mobile IP procedure. Fast handover addresses the following problems: how to allow a MN to send packets as soon as it detects a new subnet link, and how to deliver packets to a MN as soon as its attachment is detected by the new access router.

Network-based mobility management enables IP mobility for a host without requiring its participation in any mobility related signaling. The network is responsible for managing IP mobility on behalf of the host. The mobility entities in the network are responsible for tracking the movement of the host and initiating the required mobility signaling on its own behalf.

To achieve fast handover, Fast Mobile IPv6 (FMIPv6) has been used. FMIPv6 is network protocols always involved in the operation of MNs. In a predictive mode, a MN solicits a new access router's (NAR) information by sending a RtSolPr message. The MN uses prefix information in a PrRtAdv message to formulate a Node Care of Address (NCoA). The MN initiates a handover procedure, sending FBU to the PAR. The MN sends a UNA message to the NAR as soon as it regains connectivity on the new link, such that arriving and/or buffered packets can be forwarded immediately. In a reactive mode, the MN sends FBU message immediately after sending the UNA message.

Accordingly, there is a need for methods and systems for network-based fast handovers of internet protocols.

BRIEF SUMMARY OF THE INVENTION

Embodiments of the present invention pertain to methods and systems for handovers in a network. The methods and systems of the present invention are substantially free from involving operations of mobile nodes. By establishing a tunnel between a previous access router (PAR) and a new access router (NAR) during handover, packets and/or buffered packets can be forwarded from the PAR to the NAR to desirably solve the handover latency issue.

In one embodiment, a method for handover in a network is provided. The method includes receiving a first message from a first access network device associated with a mobile node (MN) associated with a first access router. A second message is sent to a second access router associated with a second access network device to initiate handover. A third message in response to the second message is received to establish a tunnel between the first access router and the second access router for handover. Packets designated to the MN are forwarded from the first access router to the second access router through the tunnel. In one embodiment, the second message includes a handover initiate (HI) and the third message includes a handover acknowledge (HAck) message. In another embodiment, the first message includes information of the second access network device for facilitating the first access router to find the second access router. In the other embodiment, the second message includes an identifier of the MN. In yet another embodiment, the second message includes at least one home address (HoA) of the MN. In one embodiment, the tunnel has a first end associated with an IP address, such as Proxy-Care-of-Address (Proxy-CoA), of the first access router and a second end associated with an IP address, such as Proxy-Care-of-Address (Proxy-CoA), of the second access router. In an embodiment, the method further includes decapsulating the packets received from a tunnel between a home agent (HA) and the first access router; and relaying the packets to the second access router through the tunnel between the first access router and the second access router.

In one embodiment, a method for handover in a network is provided. The network includes a mobile node (MN) associated with a first access network device associated with a first access router. The method includes receiving a first message by a second access router for linkup including a first access network device information from a second access network device associated with the second access router, the second access router being coupled with the first access router through a network. A second message indicating an occurrence of handover is sent from the second access router to the first access router in response to the first message. A third message is sent from the first access router to the second access router in response to the second message to establish a tunnel between the first access router and the second access router for handover. Packets designated to the MN are forwarded from the first access router to the second access router through the tunnel. In one embodiment, the first access router either is free from acknowledging or acknowledges the dissociation of the MN with the first access router, and the first access router buffers the packets for a predetermined period of time. In another embodiment, the second message includes a Fast Binding Update (FBU) message and the third message includes a Fast Binding Acknowledgement (FBack) message. In the other embodiment, the second message includes a link layer address of the MN. In yet the other embodiment, the tunnel has a first end associated with an IP address of the first access router and a second end associated with an IP address of the second access router.

In one embodiment, A network system includes a mobile node (MN) associated with a first access network device associated with a first access router and a second access network device associated with a second access router. The first access router is coupled with the second access router through a network. The first access network device is configured to send a first message to the first access router. The first access router is configured to send a second message to the second access router in response to the first message. The second access router is configured to send a third message to the first access router in response to the second message to establish a tunnel between the first access router and the second access router for handover. The first access router is configured to forward packets designated to the MN to the second access router through the tunnel.

In one embodiment, a network component includes a storage medium, a processor, a first interface and a second interface. The processor is coupled with the storage medium. The first interface is coupled with the processor and associated with a mobile node (MN). The second interface is coupled with the processor. The first interface is configured to receive a first message from a first access network device associated with the MN. The second interface is configured to send a second message in response to the first message to initiate handover; and receive a third message in response to the second message to establish a tunnel between the network component and the access router for handover.

In one embodiment, a network component includes a storage medium, a processor, a first interface and a second interface. The processor is coupled with the storage medium. The first interface is coupled with the processor and associated with a mobile node (MN). The second interface is coupled with the processor. The first interface is configured to receive a connection establishment message for linkup including a first access network device identifier from a second access network device. The access router is coupled with the network component through a network. The second interface is configured to send a first message indicating an occurrence of handover to an access router in response to the connection establishment message; and receive a second message in response to the first message to establish a tunnel between the network component and the access router for handover.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present invention relates to methods and systems for handovers of internet protocols. More particularly, the invention provides methods and systems for mobile node agnostic handovers of proxy mobile internet protocols (PMIP).

Depending upon the embodiment, the present invention includes various features, which may be used. For example, the methods and systems are substantially free from involving operations of mobile nodes. By establishing a tunnel between a previous access router (PAR) and a new access router (NAR) during handover, packets and/or buffered packet can be forwarded from the PAR to the NAR to desirably solve the handover latency issue. In some embodiments, the tunnel has a first end associated with a Proxy-CoA of the PAR and a second end associated with a Proxy-CoA of the NAR.

Figure 1:
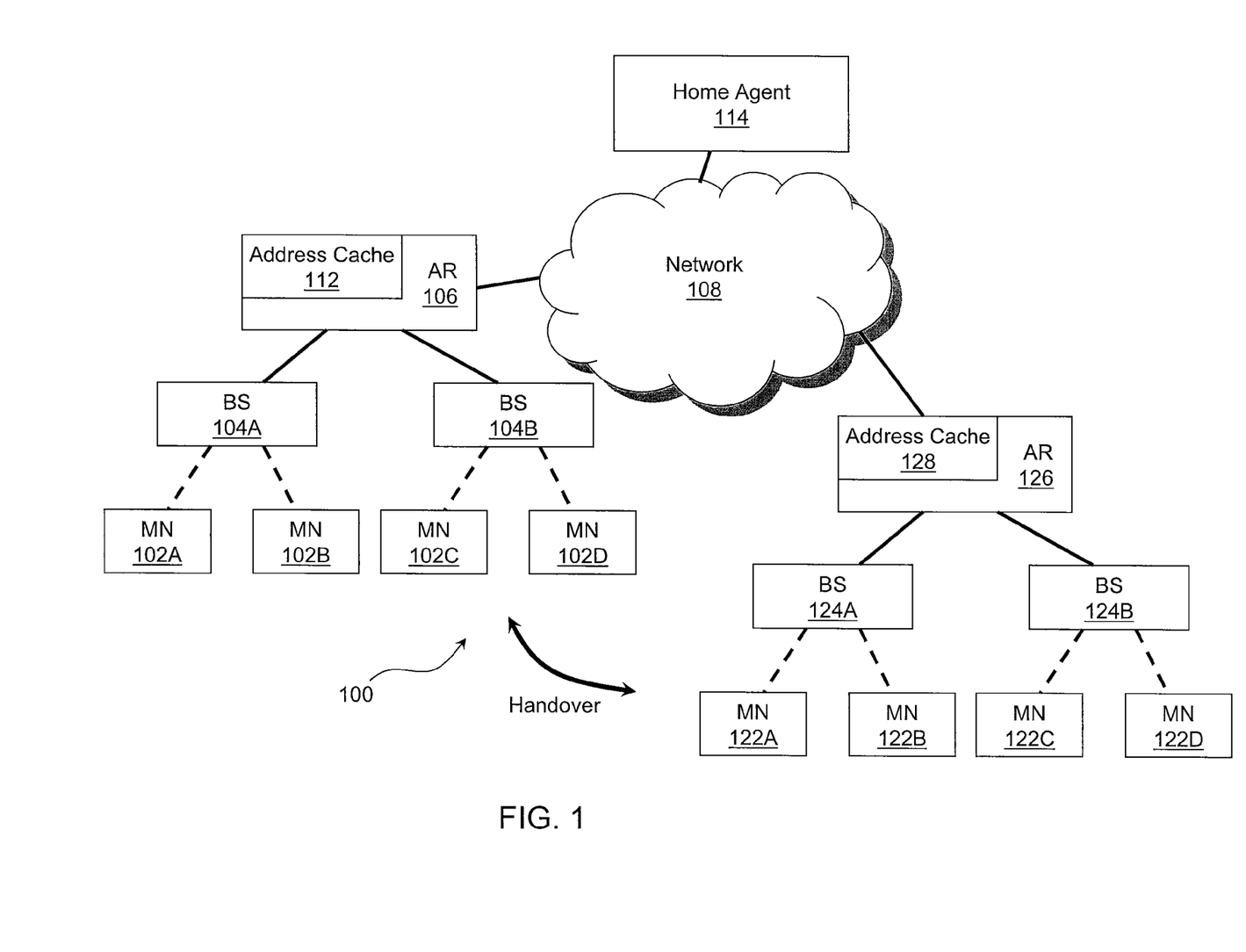
FIG. 1 illustrates an exemplary embodiment of a network system.

FIG. 1 illustrates an exemplary embodiment of a network system. In FIG. 1, system 100 comprises a plurality of mobile nodes (MNs) 102A, 102B, 102C, 102D (collectively, 102), 122A, 122B, 122C, 122D (collectively, 122), a plurality of access network devices such as access points or Base Stations (BSs) 104A, 104B (collectively, 104), 124A, 124B (collectively, 124), network components such as Access Route (ARs) 106, 126, Network 108, Address Caches 112, 128, and a Home Agent (HA) 114. In embodiments, MNs 102, 122 can communicate with BSs 104, 124, respectively, via wireless links. BSs 104, 124, ARs 106, 126, Network 108, and Home Agent 114 can communicate with each other via fixed links. It should be recognized that while FIG. 1 illustrates the system 100 with eight MNs 102, 122, four BSs 104, 124, two ARs 106, 126, and system 100 could accommodate any number of MNs, BSs, and ARs.

In an embodiment, MNs 102, 122 may be any mobile devices, components, or networks that use ARs 106, 126, respectively, to access the Network 108 and/or a third party. MNs 102, 122 can be mobile user-oriented devices that communicate with ARs 106, 126 via the BSs 104, 124, respectively. For example, MNs 102, 122 can be cellular phones, notebook computers, personal digital assistants (PDAs), or any other wireless devices. Alternatively, MNs 102, 122 can be mobile nodes that pass data from Network 108 to an external network, such as wireless routers (not shown).

BSs 104, 124 can be any devices, components, or networks that connect to MNs 102, 122 to ARs 106, 126, respectively. For example, BSs 104, 124 can be fixed devices that are associated with ARs 106, 126 via an Ethernet link and to MNs 102, 122, respectively, via a wireless link. BSs 104, 124 can manage connectivity and transport data between MNs 102, 122 and ARs 106, 126. In embodiments, BSs 104, 124 can relay Neighbor Solicitation (NS) messages from MNs 102, 122 to ARs 106, 126, respectively, and relay Router Advertisement (RA) messages from ARs 106, 126 to MNs 102, 122, respectively. BSs 104 can relay other types of messages between MNs 102, 122 and ARs 106, 126.

ARs 106, 126 can be devices, components, or networks that allows MNs 102, 122 to communicate with Network 108 and/or a third party network. In embodiments, ARs 106, 126 can be first Internet Protocol (IP) routers that MNs 102, 122 encounter, such as Broadband Remote Access Services (BRAS), Media Access Gateways (MAGs), or Access Service Network Gateways (ASN-GW). ARs 106, 126 may be Packet Data Servicing Nodes (PDSN) in a 3GPP2 network, or Gateway GPRS Support Nodes (GGSN) in a 3GPP network. In another embodiment, ARs 106, 126 can be nodes that forwards IPv4 and/or IPv6 packets that are not explicitly addressed to ARs 106, 126. ARs 106, 126 can be any fixed point that provides wireless access network coverage to MNs 102, 122, respectively. ARs 106, 126 can communicate with MNs 102, 122 through a fixed link to BSs 104, 124, or may communicate directly with MNs 102, 122 via a wireless link. ARs 106, 126 can also communicate with Network 108 and/or a third party network using a fixed link. In embodiments, ARs 106, 126 can receive a prefix request from one of MNs 102, 126, respectively, that wishes to join the network. ARs 106, 126 can forward the prefixes to MNs 102, 122, respectivley.

Network 108 can be any of various types of networks that exchange data between ARs 106, 126, and Home Agent 114. For example, Network 108 can be a Packet Switched Network (PSN), an Intranet, an Internet, a local area network (LAN), a public switched telephone network (PSTN), or any other network. Network 108 can be an Ethernet transport network, a backbone network, an access network, an optical network, a wire-line network, an IEEE 802 network, or a wireless network, such as a cellular network. One of ordinary skill in the art is aware of other embodiments of Network 108.

System 100 can include Address Caches 112, 128. Address Caches 112, 128 can be databases, caches, or memory storages containing the IP address information for MNs 102, 122 and any other IP nodes in communication with ARs 106, 126. The address information can include all of the global IP addresses, can be limited to the IP address with a network, or can be limited to the IP addresses associated with ARs, 106, 126. Address Caches 112, 128 can be managed by ARs 106, 126 or a Neighbor Discovery (ND) node. In embodiments, the entries in Address Caches 112, 128 can be maintained using information that passes through ARs 106, 126 or ND node, such as DAD NS or RA messages. An entry in Address Caches 112, 128 can be created when one of MNs 102, 122 is assigned a unique address. An entry in Address Caches 112, 128 can be deleted when MNs 102, 122 are no longer associated with ARs 106, 126, such as when ARs 106, 126 receive a deregistration message from one of MNs 102, 122 or another entity that is authorized to deregister MNs 102, 122. Address Caches 112, 128 can be created and modified by any other methods known to persons of ordinary skill in the art.

Home Agent 114 can be any IPv4 device, IPv6 device, component, or network that may manage at least some of the AR's responsibilities. In embodiments, Home Agent 114 can be a Local Mobility Anchor (LMA) of Proxy Mobile IPv6, a PDSN in a 3GPP network, or a GGSN in a 3GPP2 network. Home Agent 114 can serve as a DHCP client or an AAA client, instead of ARs 106, 126. Home Agent 114 can also contain Address Caches 112, 128. Home Agent 114 can handle IP routing for MNs 102, 122 that may roam into a foreign network. In embodiments, Home Agent 114 can establish a direct connection or indirect connection with ARs 106, 126 through Network 108.

The components described above may communicate with each other via fixed and/or wireless links using a variety of technologies. The wireless links may be created dynamically when one of MNs 102 attaches to AR 106 directly or through BSs 104. Examples of wireless link technologies include Worldwide Interoperability for Microwave Access (WiMAX), Wireless Fidelity (WiFi), Code Division Multiple Access (CDMA), Wideband CDMA (WCDMA), Orthogonal Frequency Division Multiple Access (OFDMA), Time Division Multiple Access (TDMA), Global System for Mobile communications (GSM), Enhanced Data for GSM Evolution (EDGE), Universal Mobile Telecommunication SysteMN (UMTS), Third Generation Partnership Project (3GPP), Third Generation Partnership Project 2 (3GPP2), Advanced Mobile Phone Service (AMPS), one of the Institute of Electrical and Electronic Engineers (IEEE) 802 wireless networks such as 802.16d/e, or any other wireless network. The remaining components may be coupled withgether via fixed links, such as electrical or optical links. Examples of fixed link technologies include Ethernet, Asynchronous Transfer Mode (ATM), Synchronous Optical Network (SONET), and Synchronous Digital Hierarchy (SDH). The fixed and wireless links may have a fixed bandwidth such that a fixed amount of data is transported over the link, or may have a variable-sized bandwidth.

Figure 2:
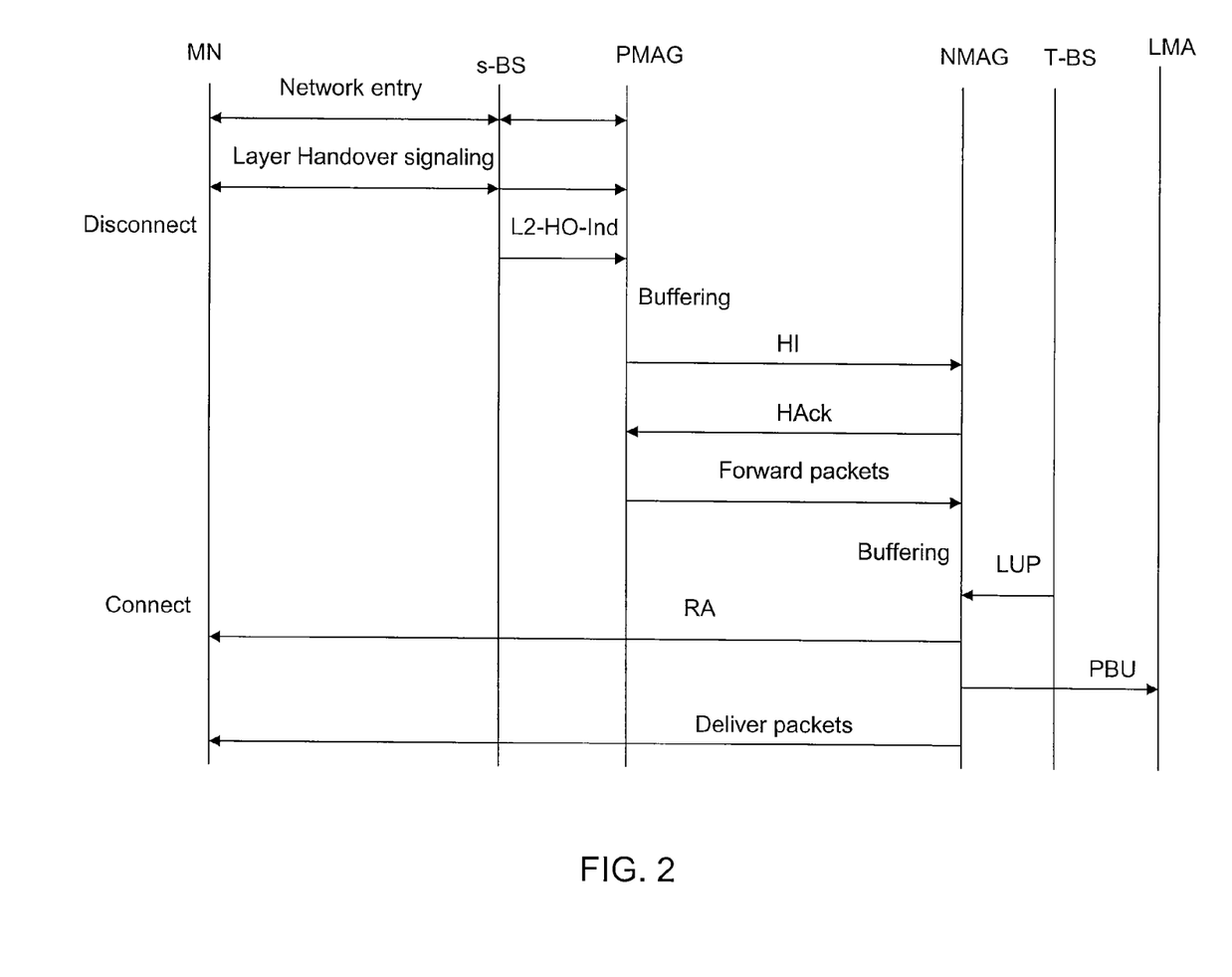
FIG. 2 is a schematic drawing showing an exemplary fast handover method for proxy mobile internet protocols v6 (PMIPv6).

FIG. 2 is a schematic drawing showing an exemplary fast handover method for proxy mobile internet protocols v6 (PMIPv6). The exemplary method shown in FIG. 2 can be referred to as a predictive mode.

In FIG. 2, the MN performs a network entry procedure. In the network entry procedure, access, authentication and address configuration of IPv6 can be performed for IP connection. After the IP connection, a previous mobile access gateway (PMAG) can detect the association of the MN and performs signaling for the MN. Before the MN is to be dissociated with a serving base station (s-BS) and to be associated with a target base station (t-BS), a negotiation occurs between the MN and the s-BS through a layer 2 (L2) handover signaling. After the decision of the L2 handover is made and/or the MN is dissociated with the s-BS of the PMAG, the s-BS sends the PMAG a L2 handover indication (L2-HO-IND) message. In embodiments, the L2-HO-IND message can include the identifier of the t-BS (target BS-ID) for facilitating the PMAG to find the NMAG. In embodiments, the PMAG buffers the packets designated to the MN during the handover.

The PMAG and/or a new mobile access gateway (NMAG) can include [BS-ID, Proxy-Care-of Address (Proxy-CoA)] tuples. After receiving the L2-HO-IND message, the PMAG can collect a context related with the MN. For example, the context can include at least one of an identifier of the MN, home address of the MN (MN-HoA), a home network prefix of the MN (MN-HNP), a Proxy-Care-of address (Proxy-CoA) of the MN in the PMAG and a media access control (MAC) address of the MN. The identifier of the MN can be link-layer address. In embodiments, the identifier of the MN can be any information that can desirably identify the MN or used to retrieve a profile of the MN from a policy store. The MAC address of the MN is used to correlate a Binding Update List and a corresponding link layer, such as a layer 2 link. In embodiments, the Binding Update List can include MAC address. Link layer can be identified by the MAC address. The Binding Update List and link layer can refer to each other through the MAC address. The MN-HoA is conveyed by an IP Address Option. The MN-HoA is an element of the Binding Update List in the NMAG. All traffic from the source address MN-HoA is routed via a bidirectional tunnel between the PMAG and the NMAG if a tunnel between the LMA and the NMAG is not established. In embodiments, the Option is desired if the MN is IPv6 or dual stack support. The MN-HNP is conveyed by a New Router Prefix Information Option. To emulate a home link of the MN, a Home Network Prefix is included in a Router Advertisement of the NMAG.

The PMAG can determine an address of the NMAG for the destination of a message including a handover initiate (HI) message. The HI message can include MN identifier, Proxy-CoA of PMAG, Proxy-CoA of NMAG, MN MAC, MN-HoA, LMAA, IPv4 LMAA, MN-HNP, Link-local Address of PMAG, DHCP Server Address, IPv4 DHCP Server Address, and/or Vendor Specific Option.

The PMAG can use the BS-ID included in the L2-HO-IND message to retrieve a Proxy-CoA of the NMAG from the [BS-ID, Proxy-CoA] tuples. The PMAG then send the HI to the NMAG. The HI message can be an Internet Control Mobile Protocol (ICMPv6). The HI message is sent from the PMAG to the NMAG to establish a bi-directional tunnel therebetween.

In embodiments, the NMAG creates a Binding Update List for the MN in response to the information included in the HI message. The NMAG can synchronize the context with the t-BS. The NMAG then sends a message including a handover acknowledge (HAck) message to the PMAG. The HAck message can include, for example, HAck and/or Proxy-CoA of NMAG.

After the PMAG receives the HAck message, the bi-directional tunnel is established between the PMAG and the NMAG. The tunnel is established, such that the packets buffered by the PMAG can be forwarded from the PMAG to the NMAG to desirably avoid the handover latency issue. In embodiments, one end of the tunnel associated with the PMAG has the Proxy-CoA of the PMAG and another end of the tunnel associated with the NMAG has the Proxy-CoA of the NMAG.

Referring again to FIG. 2, the buffered packets by the PMAG can be forwarded to the NMAG through the tunnel based on the MN-HoA. The PMAG decapsulates packets received from a tunnel between the PMAG and a Local Mobility Anchor (LMA). The PMAG then encapsulates the packets and sends the packets to NMAG through the tunnel between the PMAG and the NMAG. In embodiments, the NMAG can buffer the packets before the MN associates or connects with the NMAG.

After the MN associates with the t-BS of the NMAG, the MN performs a network re-entry. It is noted that the context transmitted from the PMAG can be used to desirably expedite the re-entry procedure. After a layer 2 link is established, the t-BS sends a Link Up (LUP) message to the NMAG. The NMAG then sends a Router Advertisement (RA) with information of the NMAG to the MN in response to the LUP. The information of the NMAG can desirably facilitate the MN to send packets.

In FIG. 2, the NMAG can send a message including a Fast Binding Update (FBU) message to the LMA to update the binding in the LMA. The NMAG then delivers the buffered packets to the MN. In embodiments, AAA-based secret keys or local certificate authorities (CAs) to protect signal exchanges between the PMAG and the NMAG.

In embodiments, the packets designated to the MN are received through a tunnel between a home agent (HA) and the PMAG and descapsulated. The descapsulated packets are relayed to the NMAG through the tunnel between the PMAG and the NMAG.

Merely by way of example, the invention is described as it applies to proxy mobile internet protocol v6 network, but it should be recognized that the invention has a broader range of applicability"

Figure 3:
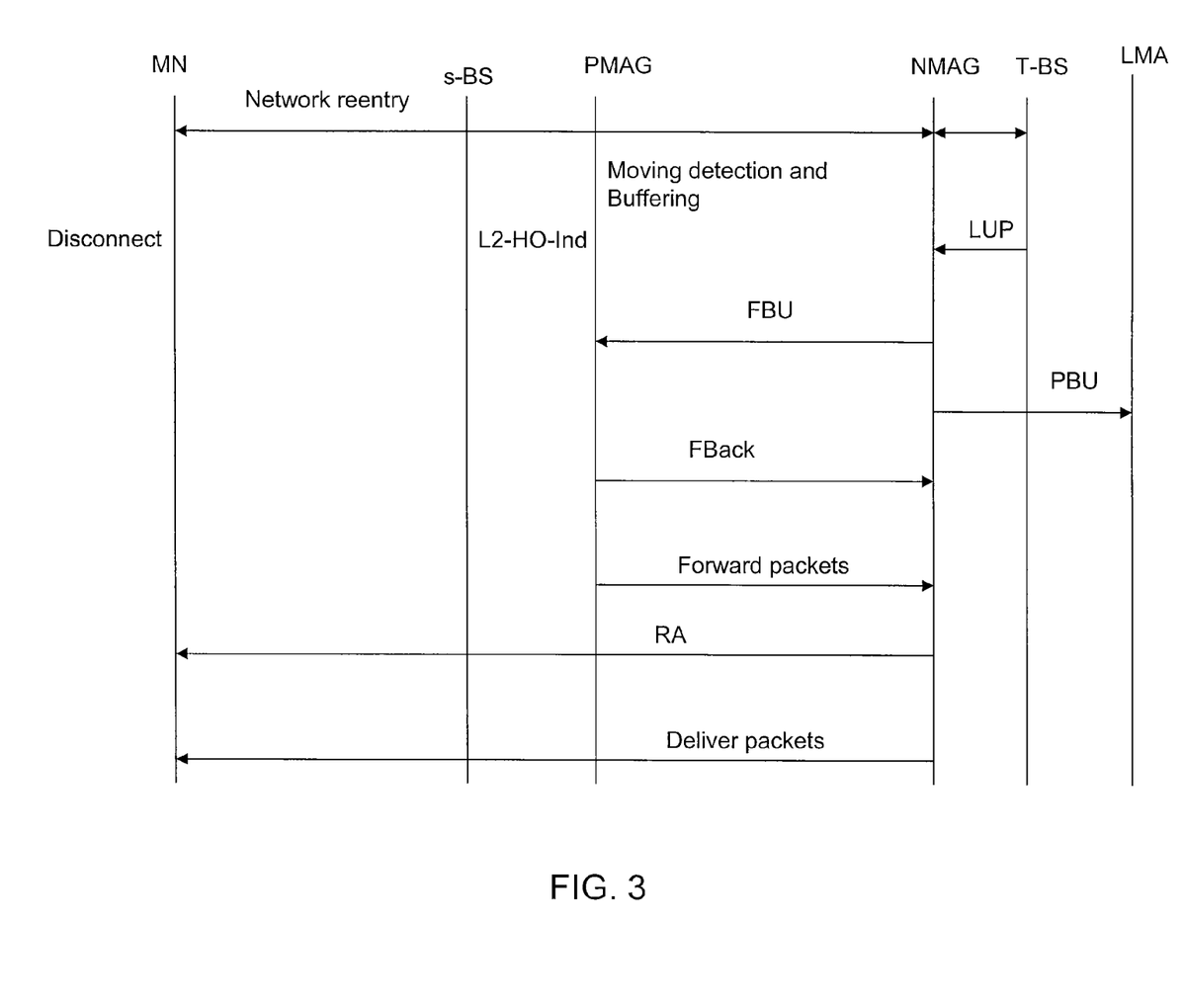
FIG. 3 is a schematic drawing showing another exemplary fast handover method for proxy mobile internet protocols v6 (PMIPv6).

FIG. 3 is a schematic drawing showing another exemplary fast handover method for proxy mobile internet protocols v6 (PMIPv6). The exemplary method shown in FIG. 3 can be referred to as a reactive mode.

In FIG. 3, the MN performs a network re-entry procedure to establish the link layer. Contexts from previous sessions are desired to establish the link layer.

The PMAG can detect the association of the MN and/or buffer the packets. In embodiments for reducing packet loss during handover, the PMAG can automatically buffer packets for the MN which is going to be dissociated with the s-BS of the PMAG and to be associated with the t-BS of the NMAG. In an embodiment, the MN merely dissociates with the s-BS of the PMAG and the PMAG is free from acknowledging the dissociation of the MN. The PMAG can automatically buffer packets designated to the MN, for example, for a pre-determined period of time. In another embodiment, the PMAG acknowledges the dissociation of the MN, but the dissociation of the MN is not completed. The PMAG can merely buffer the packets designated the MN. With the buffering of the packets, denial of service (DoS) attacks and/or errors can be desirably avoided.

After the re-entry of the MN, the t-BS sends a LUP message to the NMAG. During the network re-entry procedure, previous BS-ID and media access control (MAC) addresses are available. The NMAG sends the PMAG a message including a Fast Binding Update (FBU) message. The FBU message can include, for example, FBU, Proxy-CoA of PMAG, Proxy-CoA of NMAG, and/or MN MAC. In embodiments, the FBU message includes an identifier of the MN of a link layer address of the MN. The identifier of the MN can be any information that can desirably identify the MN or used to retrieve a profile of the MN from a policy store.

In embodiments, the NMAG can determine the address of the PMAG by referring to [BS-ID, Proxy-CoA] tuples of the NMAG. In embodiments, the previous BS-ID can be exchanged during the network re-entry procedure in a WiMAX link [802.16e], for example. In embodiments, the NMAG can send a PBU message to a LMA to update the binding in the LMA.

Based on the MAC address of the MN, the PMAG can identify a Binding Update List of the MN. The PMAG can collect a context related to the MN. The context can include at least one of an identifier of the MN, a home address (HoA) of the MN, a home network prefix (HNP) of the MN, a Proxy-Care-of address (Proxy-CoA) of the MN in the PMAG and a media access control (MAC) address of the MN. The PMAG can transfer the context to the NMAG by a message including a Fast Binding Acknowledge (FBack) message. The FBack message can include, for example, FBack. The FBack message is sent by the PMAG to acknowledge the receipt of the Fast Binding Update message. The FBack message is sent to establish the bi-directional tunnel and to transfer contexts.

After the NMAG receives the FBack message, a bi-directional tunnel is established between the PMAG and the NMAG. The packets buffered by the PMAG can be forwarded from the PMAG to the NMAG to desirably avoid the handover latency issue. In embodiments, one end of the tunnel associated with the PMAG has the Proxy-CoA of the PMAG and another end of the tunnel associated with the NMAG has the Proxy-CoA of the NMAG.

After the bi-directional tunnel is established, the PMAG can forward the buffered packets to the NMAG. In embodiments, the NMAG can send a Router Advertisemnent (RA) message including a context related to the NMAG. The context related to the NMAG can desirably facilitate the MN to send packets. The NMAG then sends packets to the MN.

Figure 4:
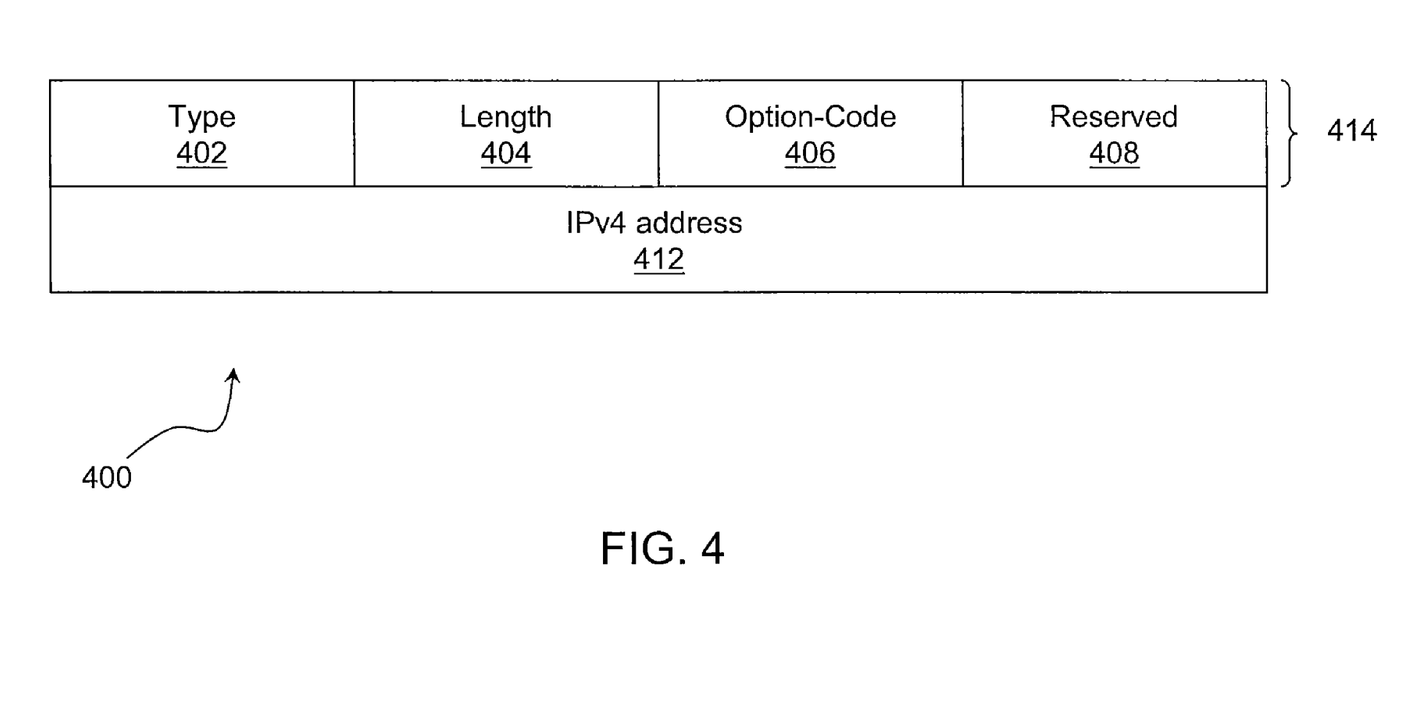
FIG. 4 is an illustration of one embodiment of a message format for IPv4.

Following are descriptions of exemplary message formats that can be used in the PMIP network system. FIG. 4 is an illustration of one embodiment of a message format for IPv4. Message 400 comprises a header 414 and an address 412, such as IPv4 address. Header 414 can be 32 bits in size, and may include an 8-bit Type field 402, an 8-bit Length field 404, an 8-bit Option-Code field 406, an 8-bit Reserved field 408. Type field 402 can be used to indicate the type of the message. Length field 404 can be used to specify the length of the address in 8-octet units. Option-Code field 406 can be used to create an additional level of message granularity. Reserved field 408 can be initialized to zero by the sender and ignored by the receiver. Header 414 and Address field 412 can be succeeded by additional fields of various sizes and functions. In embodiments, a MN operating in IPv4 mode or a dual-stack mode can obtain an IPv4 home address. If the transport network between the LMA and the MAGs is an IPv4 network, an IPv4 address of the LMA is desired. This option is used for transfer of the IPv4 address between the PMAG and the NMAG.

Figure 5:
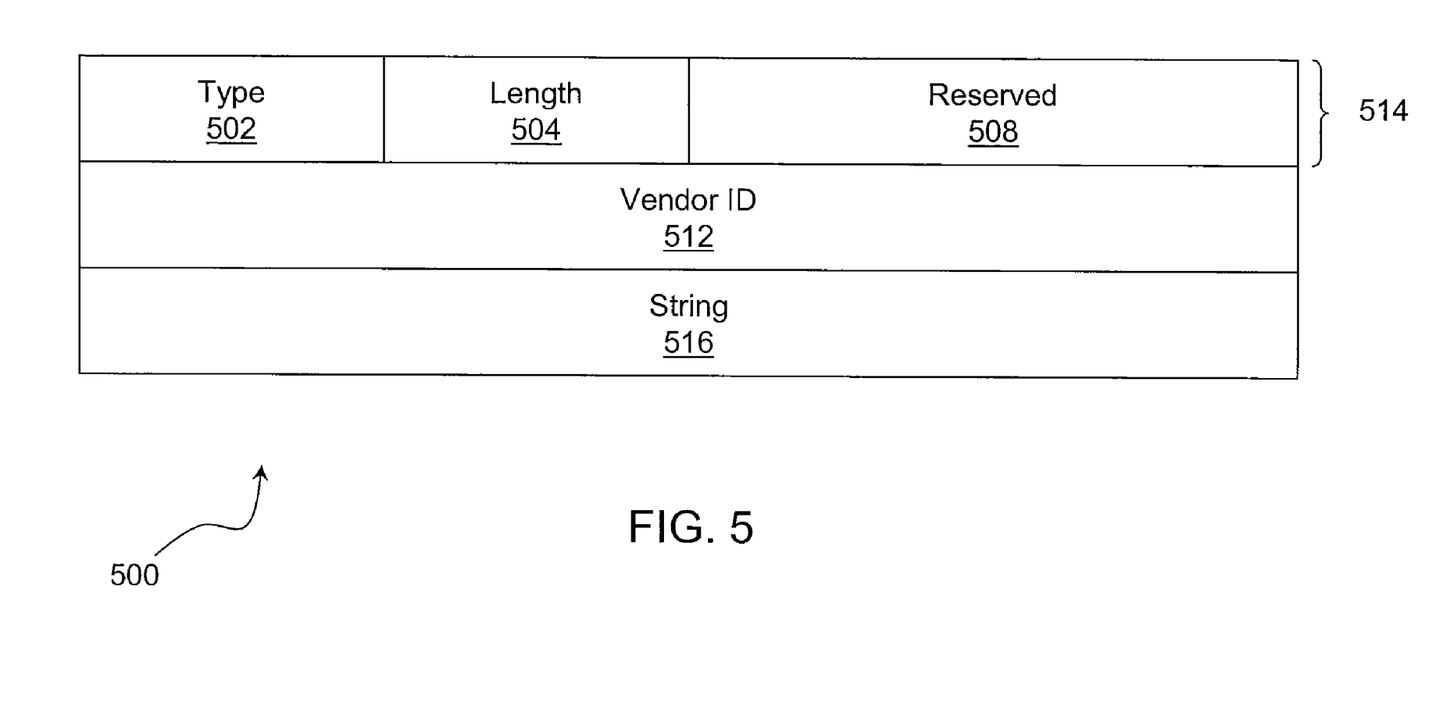
FIG. 5 is an illustration of one embodiment of a message format for vendor specific implementation.

FIG. 5 is an illustration of one embodiment of another exemplary message format for vendor specific implementation. Message 500 comprises a header 514, a vendor ID 512 and a string 516. Header 514 can be 32 bits in size, and may include an 8-bit Type field 502, an 8-bit Length field 504, a 16-bit Reserved field 508. Type field 502 can be used to indicate the type of the message. Length field 504 can be used to specify the length of the address in 8-octet units. Reserved field 508 can be initialized to zero by the sender and ignored by the receiver. Message header 514 may be followed by a 128-bit Vendor ID field 512 that can be a SMI Network Management Private Enterprise Code of the Vendor/Organization. Vendor ID field can be followed by a 128-bit string field 516, which can be one or more 8-octet units. String field 516 can include information of site and application. In embodiments, it can be encoded as a sequence of type/length/value fields. In other embodiments, multiple sub-options may be encoded within a single Vendor Specific option.

Figure 6:
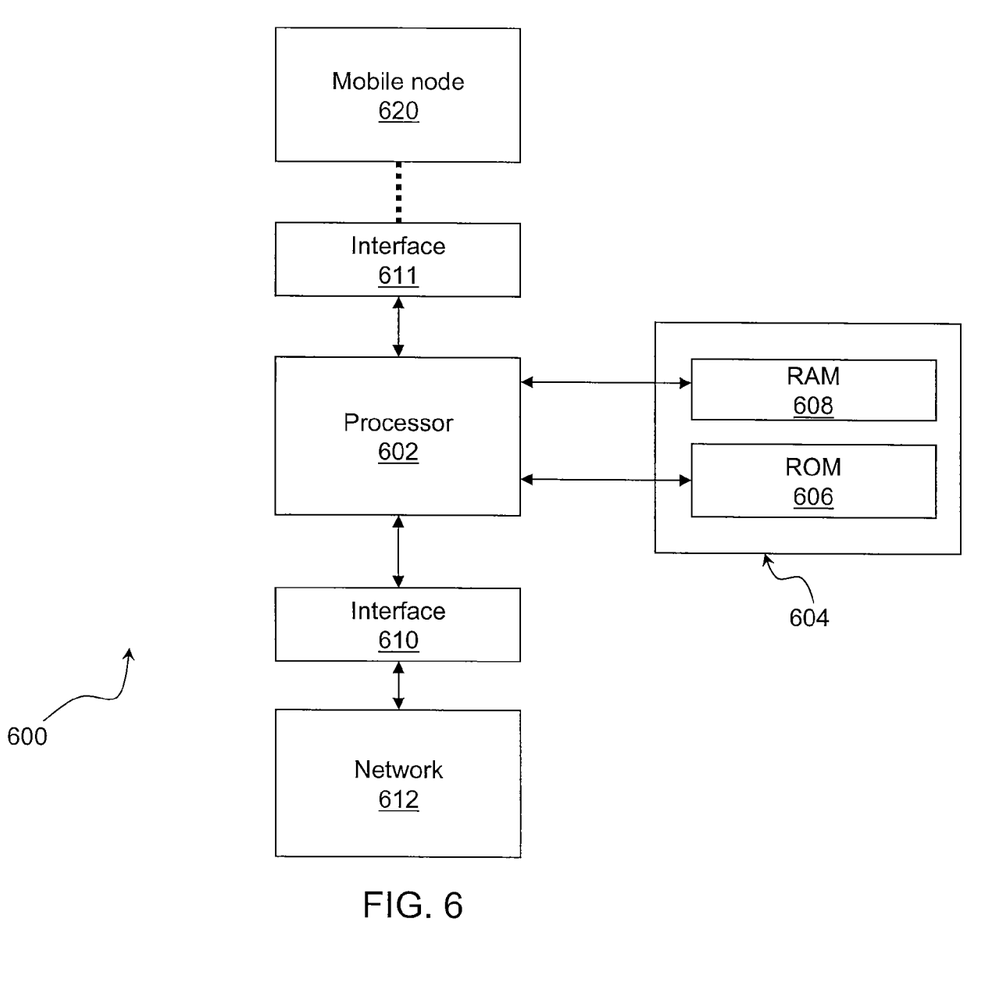
FIG. 6 illustrates an exemplary network component.

FIG. 6 illustrates an exemplary network component. Network component can be, for example, an access router as described above in conjunction with FIG. 1. Network component 600 can include processor 602 (which may be referred to as a central processor unit or CPU) that is in communication with a storage medium 604, which can include, for example, read only memory (ROM) 606, and/or random access memory (RAM) 608, and interfaces 610, 611. Network component 600 can be coupled with network 612 and mobile node 620. Processor 602 may be implemented as one or more CPU chips. One of ordinary skill in the art will appreciate that the computer may contain more than one processors, where some of processors may recognize the receipt of and promote the sending of data via the other processors.

Storage medium 604 is typically comprised of one or more disk drives or tape drives and is used for storage of data. Storage medium 604 may be used to store programs that are loaded into RAM 608 when such programs are selected for execution. ROM 606 is used to store instructions and perhaps data that are read during program execution. ROM 606 is a non-volatile memory device that typically has a small memory capacity relative to the larger memory capacity of secondary storage. RAM 608 is used to store volatile data and perhaps to store instructions. Interfaces 610, 611 can be configured to perform the procedures set forth above in conjunction with FIGS. 3, and 4.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the precursor" includes reference to one or more precursors and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method for handover in a network, the method comprising:
    receiving a first message from a first access network device that is associated with a mobile node (MN) and that is also associated with a first access router;
    sending a second message in response to the first message to a second access router associated with a second access network device to initiate handover;
    receiving a third message in response to the second message to establish a tunnel between the first access router and the second access router for handover; and
    forwarding packets designated to the MN from the first access router to the second access router through the tunnel.

2. The method of claim 1, wherein the second message includes a handover initiate (HI) and the third message includes a handover acknowledge (HAck) message.

3. The method of claim 1, wherein the first message includes information of the second access network device for facilitating the first access router to find the second access router.

4. The method of claim 1, wherein the second message includes an identifier of the MN or a link layer address of the MN.

5. The method of claim 1, wherein the second message includes at least one home address (HoA) of the MN.

6. The method of claim 1, wherein each of the first access network device and the second access network device is an access point or a base station.

7. The method of claim 1, wherein the tunnel has a first end associated with an IP address of the first access router and a second end associated with an IP address of the second access router.

8. The method of claim 7, wherein the IP address of the first access router is a Proxy-Care-of-Address (Proxy-CoA) of the first access router, and the IP address of the second access router is a Proxy-CoA of the second access router.

9. The method of claim 1 further comprising:
    decapsulating the packets received from a tunnel between a home agent (HA) and the first access router; and
    relaying the packets to the second access router through the tunnel between the first access router and the second access router.

10. The method of claim 1, wherein the first access router receives the packets whose source address is the MN and forwards the packets through a tunnel between a home agent (HA) and the first access router.

11. A method for handover in a network, including a mobile node (MN) associated with a first access network device associated with a first access router, the method comprising:
    receiving a first message by a second access router for linkup including a first access network device information from a second access network device associated with the second access router, the second access router being coupled with the first access router through a network;

sending a second message indicating an occurrence of handover from the second access router to the first access router in response to the first message;

sending a third message from the first access router to the second access router in response to the second message to establish a tunnel between the first access router and the second access router for handover; and forwarding packets designated to the MN from the first access router to the second access router through the tunnel.

12. The method of claim 11, wherein the first access router either is free from acknowledging or acknowledges the dissociation of the MN with the first access router, and the first access router buffers the packets for a predetermined period of time.

13. The method of claim 11, wherein the second message includes a Fast Binding Update (FBU) message and the third message includes a Fast Binding Acknowledgement (FBack) message.

14. The method of claim 11, wherein the second message includes an identifier of the MN or a link layer address of the MN.

15. The method of claim 11, wherein the tunnel has a first end associated with an IP address of the first access router and a second end associated with an IP address of the second access router.

16. A network system comprising:
a mobile node (MN) associated with a first access network device associated with a first access router and a second access network device associated with a second access router, the first access router being coupled with the second access router through a network,
wherein the first access network device is configured to send a first message to the first access router, the first access router is configured to send a second message to the second access router in response to the first message, the second access router is configured to send a third message to the first access router in response to the second message to establish a tunnel between the first access router and the second access router for handover, and the first access router is configured to forward packets designated to the MN to the second access router through the tunnel,
wherein the first message includes information of the second access network device for facilitating the first access router to find the second access router, and
wherein the tunnel has a first end associated with an IP address of the first access router and a second end associated with an IP address of the second access router.

17. A network component, comprising:
a storage medium;
a processor coupled with the storage medium;
a first interface coupled with the processor, the first interface being associated with a mobile node (MN); and
a second interface coupled with the processor, wherein
the first interface is configured to receive a first message from a first access network device associated with the MN, and
the second interface is configured to send a second message in response to the first message to initiate handover; and
receive a third message in response to the second message to establish a tunnel between the network component and an access router for handover.

18. The network component of claim 17, wherein the second message includes a handover initiate (HI) and the third message includes a handover acknowledge (HAck) message.

19. The network component of claim 17, wherein the first message includes access network device information for facilitating the network component to find the access router.

20. The network component of claim 17, wherein the second message includes at least one home address (HoA) of the MN.

21. The network component of claim 17, wherein the tunnel has a first end associated with an IP address of the network component and a second end associated with an IP address of the access router.

22. The network component of claim 17, wherein the processor is configured to decapsulate the packets received from a tunnel between a home agent (HA) and the network component, and relay the packets to the access router through the tunnel between the network component and the access router.

23. A network component, comprising:
a storage medium;
a processor coupled with the storage medium;
a first interface coupled with the processor, the first interface being associated with a mobile node (MN); and
a second interface coupled with the processor, wherein
the first interface is configured to receive a connection establishment message for linkup including a first access network device information from a second access network device; and
the second interface is configured to send a first message indicating an occurrence of handover to an access router in response to the connection establishment message; and
receive a second message in response to the first message to establish a tunnel between the network component and the access router for handover.

24. The network component of claim 23, wherein the first message includes an identifier of the MN or a link layer address of the MN.

25. The network component of claim 23, wherein the tunnel has a first end associated with an IP address of the network component and a second end associated with an IP address of the access router.

* * * * *